US010015132B1

(12) United States Patent
Qin et al.

(10) Patent No.: US 10,015,132 B1
(45) Date of Patent: Jul. 3, 2018

(54) NETWORK VIRTUALIZATION FOR CONTAINER-BASED CLOUD COMPUTATION USING LOCATOR-IDENTIFIER SEPARATION PROTOCOL

(71) Applicant: EMC Corporation, Hopkinton, MA (US)

(72) Inventors: Xiaohong Qin, Saratoga, CA (US); Kenneth Durazzo, San Ramon, CA (US); Suresh Kumar, Sunnyvale, CA (US); Vaibhav Khanduja, Cupertino, CA (US); Ryan Wallner, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 550 days.

(21) Appl. No.: 14/675,169

(22) Filed: Mar. 31, 2015

(51) Int. Cl.
*G06F 15/173* (2006.01)
*H04L 29/12* (2006.01)

(52) U.S. Cl.
CPC ...... *H04L 61/2592* (2013.01); *H04L 61/2532* (2013.01); *H04L 61/2567* (2013.01)

(58) Field of Classification Search
CPC .................................................. H04L 61/2592
See application file for complete search history.

(56) References Cited

U.S. PATENT DOCUMENTS

2010/0161658 A1\* 6/2010 Hamynen ........... G06F 17/3087
707/770
2011/0261800 A1 10/2011 You et al.
(Continued)

FOREIGN PATENT DOCUMENTS

WO 2010074512 A2 7/2010
WO 2013007130 A1 1/2013

OTHER PUBLICATIONS

Farinacci ("The Locator/ID Separation Protocol", RFC 6830, Jan. 2013).\*

(Continued)

*Primary Examiner* — Vivek Srivastava
*Assistant Examiner* — Nicholas Celani
(74) *Attorney, Agent, or Firm* — Ryan, Mason & Lewis, LLP

(57) ABSTRACT

At least one processing device comprises a processor coupled to a memory and implements virtualization infrastructure including a first container comprising a software agent of a locator-identifier separation protocol. The software agent is configured to communicate with a locator-identifier mapping system that associates identifiers of respective endpoints with respective locators in accordance with the locator-identifier separation protocol. The endpoints comprise respective ones of a plurality of additional containers of the virtualization infrastructure. The first container may be coupled to the plurality of additional containers via a bridge element that combines virtual interfaces of respective ones of the additional containers into a single physical network interface. The first container may additionally be coupled to a network via a router configured to operate in accordance with the locator-identifier separation protocol as an ingress tunnel router with respect to inbound packets and as an egress tunnel router with respect to outbound packets.

20 Claims, 2 Drawing Sheets

(56) References Cited

U.S. PATENT DOCUMENTS

| | | | |
|---|---|---|---|
| 2012/0016970 A1* | 1/2012 | Shah | G06F 17/30345 709/220 |
| 2012/0314714 A1 | 12/2012 | Hu et al. | |
| 2013/0191477 A1 | 7/2013 | You et al. | |
| 2014/0068703 A1* | 3/2014 | Balus | H04L 41/0893 726/1 |
| 2014/0301387 A1 | 10/2014 | Subramanian et al. | |
| 2014/0304398 A1* | 10/2014 | Carlen | H04L 65/80 709/224 |
| 2015/0256481 A1* | 9/2015 | Turovsky | H04L 47/76 709/226 |
| 2016/0164832 A1* | 6/2016 | Bellagamba | H04L 67/10 726/12 |
| 2017/0005923 A1* | 1/2017 | Babakian | H04L 69/324 |
| 2017/0019328 A1* | 1/2017 | Moreno | H04L 45/22 |

OTHER PUBLICATIONS

Fuller ("Locator/ID Separation Protocol Map-Server Interface", RFC 6833, Jan. 2013).*

D. Bernstein et al., "Blueprint for the Intercloud—Protocols and Formats for Cloud Computing Interoperability," IEEE Fourth International Conference on Internet and Web Applications and Services (ICIW), May 2009, pp. 328-336, Venice/Mestre, Italy.

F. Hao et al., "Enhancing Dynamic Cloud-Based Services Using Network Virtualization," Proceedings of First ACM SIGCOMM Workshop on Virtualized Infrastructure Systems and Architecture (VISA), Aug. 2009, pp. 37-44, Barcelona, Spain.

D. Farinacci et al., "The Locator/ID Separation Protocol (LISP)," Internet Engineering Task Force (IETF), Request for Comments: 6830, Jan. 2013, 75 pages.

Michael Williams, "Docker Containers Need Security!" Nuage Networks, Jan. 12, 2015, 5 pages.

Wikipedia, "Docker (Software)," http://en.wikipedia.org/wiki/Docker_%28software%29, Mar. 7, 2015, 8 pages.

Docker, "Software-Defined NAS Filer for Shared NFS, CIFS, iSCSI and Cloud Storage with Docker," SoftNAS Cloud, 2015, 2 pages.

R. Saha et al., "Docker Offers Big Opportunity for Software-Defined Networking," IBM Corporation, Dec. 5, 2014, 10 pages.

D. Saucez et al., "Designing a Deployable Future Internet: the Locator/Identifier Separation Protocol (LISP) Case," IEEE Internet Computing, Nov.-Dec. 2012, pp. 14-21, vol. 16, No. 6.

Docker, "Implementing SoftNAS Cloud with Docker," SoftNAS Cloud, Nov. 2014, 21 pages.

W. Felter et al., "An Updated Performance Comparison of Virtual Machines and Linux Containers," IBM Research Report, RC25482, Jul. 21, 2014, 15 pages.

Wikipedia, "Locator/Identifier Separation Protocol," LISP, http://en.wikipedia.org/wiki/Locator/Identifier_Separation_Protocol, Feb. 11, 2015, 6 pages.

Christian Bryant, "LXC: Move Over Virtual Machines, Here Come Containers," tom'sIT PRO, http://www.tomsitpro.com/print/lxc-linux-containers-docker,news-1904.html, Apr. 24, 2014, 3 pages.

Stéphane Graber, "LXC 1.0: Security Features [6/10]," LXC 1.0 Blog Post Series, Jan. 1, 2014, 6 pages.

U.S. Appl. No. 14/578,582 filed in the name of S. Kumar et al. on Dec. 22, 2014 and entitled "Storage Mobility Using Locator-Identifier Separation Protocol."

* cited by examiner

NETWORK VIRTUALIZATION FOR CONTAINER-BASED CLOUD COMPUTATION USING LOCATOR-IDENTIFIER SEPARATION PROTOCOL

FIELD

The field relates generally to information processing systems, and more particularly to techniques for implementing cloud compute nodes and other virtual resources in information processing systems.

BACKGROUND

Information processing systems incorporating virtualization infrastructure are coming into increasingly widespread use. An issue that arises in such systems relates to network virtualization. For example, in a typical network virtualization arrangement, distributed compute nodes of a given system can be implemented using geographically dispersed portions of different processing platforms supporting the virtualization infrastructure. The topology of the compute nodes can change frequently due to variations in computational demands within the system. However, movement of compute nodes within such a system can be problematic in that it can require unduly complex network address translation operations. In addition, use of conventional network address translation can in some cases prevent the implementation of location-based service functionality for the compute nodes.

SUMMARY

Illustrative embodiments of the present invention provide network virtualization for container-based cloud computation using a locator-identifier separation protocol. For example, such an arrangement overcomes problems associated with conventional network address translation in information processing systems that implement compute nodes as respective containers in cloud infrastructure. It allows virtual networks of the containers to be constructed in a particularly efficient manner.

In one embodiment, at least one processing device comprises a processor coupled to a memory and implements a first container comprising a software agent of a locator-identifier separation protocol. The software agent is configured to communicate with a locator-identifier mapping system that associates identifiers of respective endpoints with respective locators in accordance with the locator-identifier separation protocol. The endpoints comprise respective ones of a plurality of additional containers. The software agent of the first container is illustratively configured to cause the additional containers to be registered as respective endpoints in the locator-identifier mapping system.

The first container in some embodiments comprises a dedicated container that is controlled by a cloud controller and the additional containers are spawned as needed to execute respective applications of cloud tenants.

The first container and the plurality of additional containers in some embodiments are implemented on a single physical processing device and are associated with a common container repository. In such an arrangement, the first container may be coupled to the plurality of additional containers via a bridge element that combines virtual interfaces of respective ones of the additional containers into a single physical network interface.

The first container is additionally coupled to a network via a router configured to operate in accordance with the locator-identifier separation protocol as an ingress tunnel router with respect to inbound packets directed to the additional containers via the first container and as an egress tunnel router with respect to outbound packets directed from the additional containers via the first container.

As noted above, illustrative embodiments described herein provide significant improvements relative to conventional arrangements. For example, in some of these embodiments, there is no longer any need to assign new network addresses to containers that change their locations within the system. Accordingly, unduly complex network address translation arrangements are avoided, leading to improved performance within the system. Moreover, location-based service functionality can be provided for containers used to implement compute nodes in the system.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising various combinations of physical and virtual processing resources.

Figure 1:
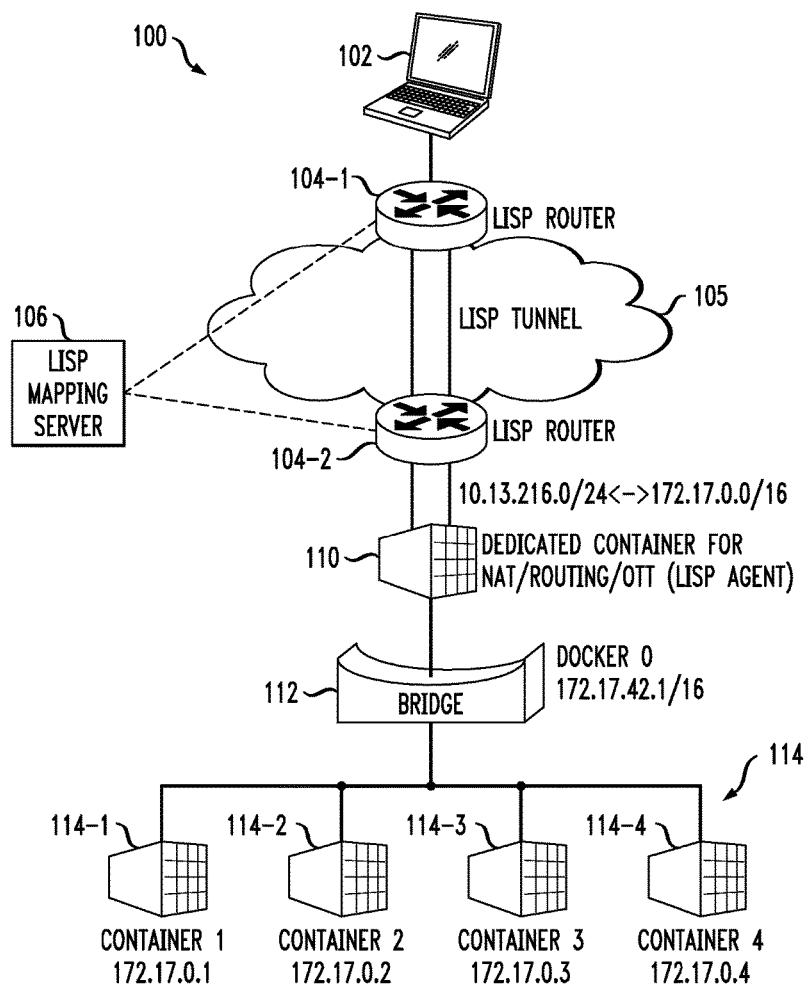
FIG. 1 shows an information processing system configured to provide network virtualization for container-based cloud computation using a locator-identifier separation protocol in an illustrative embodiment.

FIG. 1 shows an information processing system 100 comprising virtual infrastructure configured in accordance with an illustrative embodiment of the present invention. The information processing system 100 comprises a user device 102 coupled to one of a plurality of LISP routers 104-1 and 104-2 associated with a network 105.

In the present embodiment and one or more other illustrative embodiments described herein, LISP is assumed without limitation to refer to the Locator/ID Separation Protocol described in D. Farinacci et al., Internet Engineering Task Force (IETF) Request for Comments (RFC) 6830, "The Locator/ID Separation Protocol (LISP)," January 2013, which is incorporated by reference herein. However, it is to be appreciated that other types of protocols involving separation of locator and identifier in network communications can be used. Such protocols are more generally referred to herein as locator-identifier separation protocols, and the LISP protocol described in RFC 6830 is considered an example of a locator-identifier separation protocol.

The user device 102 in the FIG. 1 embodiment is illustratively implemented as a laptop computer, but a wide variety of other user devices can be utilized in a given embodiment, including, by way of example, desktop computers, tablet computers, mobile telephones and other physical or virtual devices configured to communication over a network. Such user devices are examples of what are more generally referred to herein as "endpoint devices" or simply "endpoints."

The LISP routers 104 communicate with a LISP mapping server 106. Such communications may occur over the network 105. The LISP mapping server 106 is configured to associate identifiers of respective endpoints of the system 100 with respective locators in accordance with LISP. Such identifiers in the LISP context more particularly comprise respective LISP Endpoint Identifiers (EIDs) and the locators comprise respective LISP Routing Locators (RLOCs). The network 105 associated with LISP routers 104 and LISP mapping server 106 is also referred to herein as a LISP-enabled network.

Although only a single LISP mapping server 106 is shown in this embodiment, other embodiments may include multiple such servers. For example, each of the LISP routers 104 may communicate with a different one of a plurality of LISP mapping servers 106. Such mapping servers are examples of components of what is more generally referred to herein as a LISP mapping system. The LISP mapping system illustratively includes a mapping database having a plurality of entries each comprising one of the EIDs in association with one of the RLOCs. At least portions of the mapping database are implemented using one or more LISP mapping servers such as LISP mapping server 106.

The information processing system 100 in the present embodiment utilizes the LISP mapping server 106 to control mapping between EID namespaces associated with endpoints such as user device 102 and RLOC namespaces associated with particular locations within the system 100. The use of LISP in this context allows endpoint devices such as user device 102 to move within the system 100 without changing their respective EIDs but instead changing only their respective RLOCs. More particularly, the LISP mapping server 106 stores EID-RLOC mappings that collectively allow each of a plurality of endpoint devices having respective EIDs to be located at different RLOCs within the system.

It is also be appreciated in this regard that the term "endpoint" as used herein is intended to be broadly construed, and may illustratively comprise a container, a virtual machine, a compute instance or other system element suitable for identification using an endpoint identifier that can be associated with a locator.

The EIDs and RLOCs are typically in the form of standard IP addresses. Routers such as LISP routers 104-1 and 104-2 that are arranged between an EID namespace and an RLOC namespace serve as ingress or egress tunnel routers, depending upon the direction of communication. As a given packet traverses an EID namespace, its destination address is an EID, and as the packet traverses an RLOC namespace, its destination address is an RLOC. An ingress tunnel router prepends an LISP header on a given packet received from an EID namespace. The LISP header includes the destination RLOC as determined by the ingress tunnel router from an EID-RLOC mapping in the LISP mapping database maintained by the LISP mapping server 106. The RLOC identifies an egress tunnel router, which strips the LISP header from the packet such that it can be delivered to the destination EID. Accordingly, the LISP routers 104-1 and 104-2 intercept EID-addressed packets and assist in delivering them across the network 105 where in some situations EIDs cannot be directly routed, for example, due to movement of the corresponding endpoints within the system.

As will now be described in more detail, the FIG. 1 embodiment utilizes LISP functionality to facilitate container mobility within the system 100.

The system 100 in addition to user device 102, LISP routers 104, network 105 and LISP mapping server 106 further includes container-based virtualization infrastructure comprising a first container 110, a bridge element 112 and a plurality of additional containers 114. These elements are considered one example of container-based virtualization infrastructure, and other embodiments can include a wide variety of different arrangements and configurations of such infrastructure.

The container 110 and the additional containers 114 are illustratively implemented as respective Docker containers, but one of more of the containers 110 and 114 in other embodiments can comprise other types of containers, such as LXC containers. It is therefore to be appreciated that embodiments of the present invention are not restricted to use with Docker containers or any other particular type of containers.

A given container can be implemented, for example, on a Linux processing device using the Linux kernel cgroups feature. Numerous other techniques can be used in implementing containers in a given embodiment.

The container 110 comprises a software agent more particularly referred to in this embodiment as a LISP agent. Each of the additional containers 114 represents an endpoint of the system 100. By way of example, the additional containers 114 may comprise respective cloud compute nodes of a network virtualization implementation. Such compute nodes may each be associated with one or more cloud tenants.

The LISP agent implemented in the container 110 is configured to allow the container 110 to join the LISP-enabled network 105 associated with the LISP routers 104 and the LISP mapping server 106.

The container 110 is coupled to the additional containers 114 via the bridge element 112. The bridge element 112 is illustratively configured to combine virtual interfaces of respective ones of the additional containers 114 into a single physical network interface. In this embodiment, the bridge element 112 is implemented as a pseudonetwork bridge, possibly running on a "bare metal" server, virtual machine or other type of processing device used to implement at least a portion of the virtualization infrastructure.

The bridge element 112 illustratively has a network address given by the IP address 172.17.42.1/16. Each of the additional containers 114 in this embodiment has a private IP address. More particularly, the containers 114-1, 114-2, 114-2 and 114-4, also denoted as container1, container2, container3 and container4, have respective private IP addresses given by 172.17.0.1, 172.17.0.2, 172.17.0.3 and 172.17.0.4.

Such private addresses are generally not externally addressable absent the use of network address translation. As mentioned previously, use of such network address translation can be problematic when, for example, one or more of the additional containers 114 are migrated or otherwise moved within the system 100.

It is possible for network address translation to be performed by a system element such as the bridge element 112. For example, the bridge element 112 may be configured to perform a port-based one-to-many network address translation mapping that replaces the private IP address of each container with the IP address of the bridge element 112 plus a corresponding port number. Such an arrangement utilizes the different port numbers to distinguish the different containers from one another.

Certain container implementations, such as Docker containers, utilize this type of port-based network address translation. However, the port-based network address translation approach is unduly limiting in that it only allows the containers to send outbound traffic to outside devices but not to directly receive inbound traffic from outside devices, such that the containers cannot support bidirectional IP connectivity.

As a result, many different types of software applications requiring such bidirectional IP connectivity, including, for example, web servers, database servers, security authentication servers and VPN servers, cannot be easily deployed in Docker containers and other similar arrangements that utilize port-based network address translation. Other security functionality such as SSL termination and Authentication, Authorization and Accounting are similarly difficult to implement in these port-based network address translation arrangements. Provision of certain types of storage functionality such as container support for external iSCSI devices is also problematic due to the lack of bidirectional IP connectivity.

Moreover, migration or other movement of one or more of the containers creates additional issues, in that the private addresses of any such relocated containers will generally have to be changed in conjunction with the movement. It is therefore generally not possible for location-based service functionality to be reliably implemented using such containers.

These and other serious drawbacks attributable to use of network address translation have negatively impacted the adoption of Docker containers in cloud computing and other network virtualization contexts.

The FIG. 1 embodiment advantageously overcomes these drawbacks through the configuration of container 110 to include the above-noted LISP agent. In this embodiment, the port-based network address translation approach is eliminated. Instead, the container 110 comprising the LISP agent allows the containers 114 to be individually and externally addressed. Accordingly, bidirectional IP connectivity is provided and the drawbacks of the port-based network address translation approach are avoided. In addition, migration or other movement of the containers 114 within the system is considerably facilitated, as modification of the private IP addresses of the containers is no longer required. As a result, location-based service functionality can be easily provided using the containers 114.

The container 110 in the FIG. 1 embodiment illustratively comprises a dedicated container that is implemented with the additional containers 114 on a single physical processing device with all of these containers being associated with a common container repository. This provides the container 110 and its LISP agent with knowledge of the other containers 114 implemented on the same processing device using the same container repository. The LISP agent of container 110 is therefore able to register the containers 114 with the LISP mapping system as respective EIDs sharing a common RLOC.

By way of example, the container 110 can be controlled by a cloud controller with the additional containers 114 being spawned as needed to execute respective applications of cloud tenants. In such an arrangement, the container 110 is dedicated to performance of the LISP agent functionality and persists over time while particular ones of the additional containers 114 are spawned and then possibly subsequently taken down responsive to changing demands of the cloud tenants. Accordingly, the additional containers 114 in some embodiments may be viewed as a dynamic set of containers in which individual containers come and go responsive to changing user demands within the system. However, the container 110 in such an embodiment illustratively remains dedicated to providing the LISP agent functionality, and accordingly supports the current set of additional containers deployed in the system at any given time. Alternative container configurations and functionality are possible in other embodiments.

The LISP agent implemented in the container 110 is an example of what is more generally referred to herein as a "software agent." In operation, the LISP agent registers the additional containers 114 as respective endpoints in the LISP mapping system comprising LISP mapping server 106. This illustratively occurs as the individual containers 114 are deployed to run respective applications within the system. It may involve, for example, the container 110 generating an EID-RLOC pair for each of the containers 114 and providing the resulting pairs to the LISP mapping system.

By way of example, for each of the containers 114, the LISP agent creates an EID-RLOC pair with the RLOC indicating the physical network address of the "bare metal" machine or virtual machine that serves as a host machine for the containers 114. This RLOC is shared by all of the containers 114 in an embodiment in which all of those containers are implemented on the same host machine.

In other embodiments, multiple host machines can be used to implement different subsets of the containers 114, and in such an arrangement different RLOCs can be used for the different subsets of containers 114. Every time a new container is created, the LISP agent in the container 110 creates a new EID-RLOC pair for that container and provides it to the LISP mapping system. When an existing container is deleted, the EID-RLOC pair for that container is also deleted from the LISP mapping system.

In the present embodiment, the RLOCs for respective ones of the containers 114 can each illustratively comprise the network address 172.17.42.1/16 of the bridge element 112 coupled between the container 110 and the containers 114.

The LISP agent in container 110 illustratively performs a type of network address mapping to translate between the network address 172.17.42.1/16 of the bridge element 112 and the external network address 10.13.216.0/24.

The container 110 is coupled to the network 105 via the LISP router 104-2 as shown. This LISP router is configured to operate as an ingress tunnel router with respect to inbound packets directed to the containers 114 from the network 105 via the container 110 and as an egress tunnel router with respect to outbound packets directed from the containers 114 to the network 105 via the container 110.

For example, responsive to receipt of an outbound packet from a given one of the containers 114 for delivery to an outside endpoint, such as user device 102, the container 110 encapsulates the outbound packet to form a LISP tunnel and forwards the encapsulated packet over the LISP tunnel via LISP router 104-2. To reach the user device 102, the encapsulated packet is carried by the LISP tunnel from LISP router 104-2 to LISP router 104-1 over network 105. It is then decapsulated by the LISP router 104-1 and delivered to the user device 102.

Similarly, responsive to receipt of an inbound packet from an outside endpoint, such as user device 102, for delivery to a given one of the containers 114, the container 110 decapsulates the inbound packet as received from the LISP tunnel via LISP router 104-2 and forwards the decapsulated packet to the appropriate container 114. To reach the LISP router 104-2, the inbound packet is carried by the LISP tunnel from LISP router 104-1 to LISP router 104-2 over network 105. The LISP router 104-2 in such an arrangement treats the LISP agent within container 110 as another LISP router associated with a different RLOC, in this case an RLOC corresponding to the physical network address of the bridge element 112.

It is therefore apparent that the FIG. 1 embodiment supports bidirectional IP connectivity for each of the containers 114. This considerably enhances the usability of such containers for applications such as web servers, database servers, security authentication servers and VPN servers, which as noted above generally require bidirectional IP connectivity. Other types of security functionality and storage functionality are similarly facilitated using the FIG. 1 embodiment.

By way of example, security functionality comprising a demilitarized zone (DMZ) firewall application can be deployed using one of the containers 114. This allows internal and external portions of a network to be separated through appropriate portioning of RLOC and EID address spaces. In such an arrangement, the RLOC can indicate an external DMZ network address and the EID can indicate an internal network address of a given internal device such as a mail server. Such an approach completely separates the internal and external portions of the network, leading to enhanced security and improved performance.

Another significant advantage of the FIG. 1 embodiment is that there is no need to change private IP addresses upon movement of the containers 114 within the system 100. Instead, for example, the LISP agent can simply cause the LISP router 104-2 to associate a new RLOC with any such relocated container in the corresponding EID-RLOC mapping maintained by the LISP mapping server 106.

This facilitates the implementation of location-based services functionality utilizing the containers 114, as their locations within the system can change easily and any such change will be reflected in their associated RLOCs.

For example, client applications running on mobile endpoints can be made location sensitive. As the mobile endpoints traverse through different locations, their corresponding RLOCs are sent to the LISP mapping system so as to associate the mobile endpoints with particular geographic locations. Related applications or other system elements can then provide location-based services to the mobile endpoints based on their respective current locations. For example, a mobile endpoint that is close to a given retail store can receive information such as store hours and sale items. Similarly, a mobile endpoint determined based on its RLOC to be in close proximity to a movie theater can be provided with movie show times. A wide variety of other types of location-based services can be provided based on the current RLOC of an endpoint device in a given embodiment.

The ability of illustrative embodiments to support widespread container movement is particularly useful in network virtualization scenarios involving distributed cloud compute nodes that can vary in location and configuration with user demand.

A wide variety of different types of container movement can be supported. For example, a container can be moved from one processing platform to another within a given data center or from one data center to another data center.

In conjunction with a given such container movement, a corresponding update is made to the appropriate EID-RLOC mapping stored by the LISP mapping system comprising LISP mapping server 106. Therefore, as one of the containers 114 moves within the system 100, it uses a LISP agent implemented in a dedicated container such as container 110 to update its current RLOC in the LISP mapping system. Any LISP router can then deliver traffic to the relocated container by looking up the corresponding EID-RLOC entry in a LISP mapping server of the LISP mapping system.

Accordingly, the FIG. 1 embodiment and other embodiments disclosed herein can significantly extend the capabilities of Docker containers and other types of containers in cloud computing and other network virtualization contexts.

Embodiments of the invention can be used to create virtual container networks to support a wide variety of different networks protocols, including IPv6, IPv4 and Layer 2 based network protocols.

In some embodiments, containers can be connected to a non-LISP-enabled network. This may be achieved, for example, by implementing LISP components such as LISP routers and LISP mapping servers on one or more container host machines. Such host machines are also considered examples of "processing devices" as that term is broadly utilized herein. For a given set of containers residing on such a container host machine, the "bare metal" network address or virtual machine network address of the container host machine can serve as a common RLOC for all of the containers implemented on that machine.

The particular arrangement of components shown in the FIG. 1 embodiment is presented by way of example. Numerous alternative network configurations can be used to implement network virtualization for container-based cloud computation using a locator-identifier separation protocol. Another example of an information processing system implementing such functionality will now be described in conjunction with FIG. 2.

Figure 2:
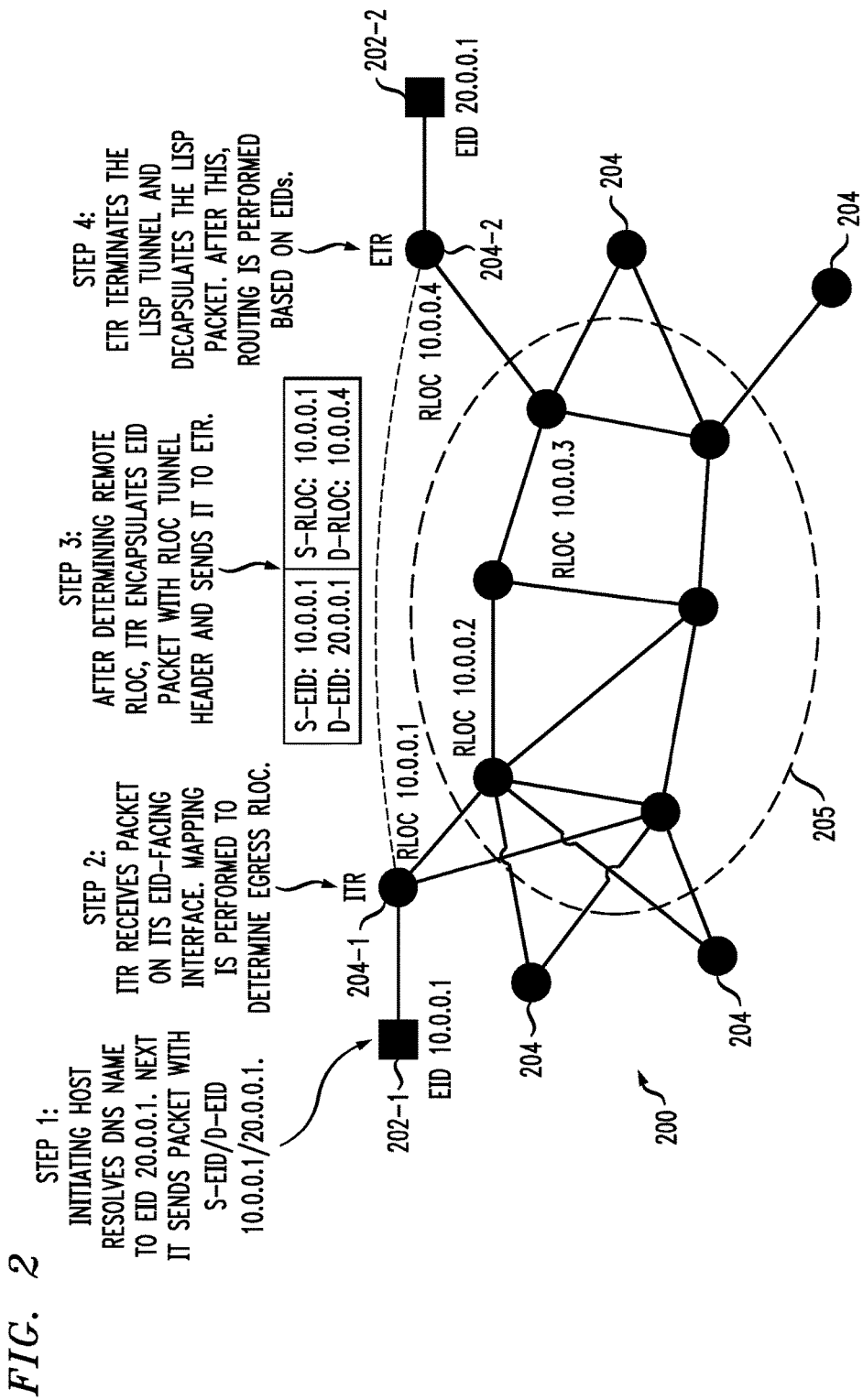
FIG. 2 shows another illustrative embodiment of an information processing system that implements network virtualization for container-based cloud computation using a locator-identifier separation protocol.

In the FIG. 2 embodiment, an information processing system 200 comprises first and second endpoints 202-1 and 202-2 having respective EIDs 10.0.0.1 and 20.0.0.1. It is assumed that the first endpoint 202-1 corresponds to a user device such as user device 102 of the FIG. 1 embodiment. The first endpoint 202-1 has a packet to be sent directly to the second endpoint 202-2, which in this embodiment is assumed to be a container such as one of the containers 114 of the FIG. 1 embodiment.

The system 200 in the FIG. 2 embodiment includes a plurality of LISP routers 204 including an ingress tunnel router (ITR) 204-1 and an egress tunnel router (ETR) 204-2. The first endpoint 202-1 is associated with RLOC 10.0.0.1 of the ITR 204-1 and the second endpoint 202-2 is associated with RLOC 10.0.0.4 of the ETR 204-2.

It is further assumed that the ETR 204-2 in this embodiment also comprises a container, namely a dedicated container such as container 110 that incorporates a LISP agent. The ETR 204-2 via its LISP agent assigns an EID-RLOC pair to the second endpoint 202-2 and provides the EID-RLOC pair to a LISP mapping system.

Other LISP routers 204 are associated with network portion 205 of system 200. The network portion 205 spans additional RLOCs including RLOC 10.0.0.2 and RLOC 10.0.0.3 as indicated in the figure.

The process of sending the packet from first endpoint 202-1 to second endpoint 202-2 includes Steps 1 through 4 as follows:

1. The first endpoint 202-1 initiates a request to the domain name service (DNS) to resolve the DNS name to the EID 20.0.0.1 of the desired packet destination. It then sends the packet using a source EID (S-EID) of 10.0.0.1 and a destination EID (D-EID) of 20.0.0.1.

2. The ITR 204-1 receives the packet on its EID-facing interface. A mapping is performed using the LISP mapping system to determine the appropriate egress RLOC for the packet.

3. After determining the remote RLOC of the desired destination EID, the ITR 204-1 encapsulates the EID packet to form a LISP packet with an RLOC tunnel header specifying a LISP tunnel. The encapsulated packet is sent to the ETR 204-2 through the network portion 205. As illustrated in the figure, the tunnel header identifies a source RLOC (S-RLOC) 10.0.0.1 and a destination RLOC (D-RLOC) 10.0.0.4.

4. The ETR 204-2 terminates the LISP tunnel and decapsulates the LISP packet. This involves restoring the original packet with S-EID and D-EID and performing the routing based on its EIDs. Accordingly, the decapsulated packet is routed using its destination EID to the desired second endpoint 202-2.

The systems 100 and 200 as shown in FIGS. 1 and 2 are illustrative examples only, and other embodiments can utilize other types and arrangements of components to implement network virtualization functionality for multiple containers.

As mentioned previously, an EID-RLOC mapping database utilized by a LISP mapping system in a given embodiment illustratively comprises a plurality of EID-RLOC mapping entries. The EID-RLOC mapping entries more particularly comprise respective EIDs in the form of IP addresses of respective ones of the containers 114, and RLOCs denoting subnets associated with the corresponding EIDs. The EID-RLOC mapping entries may include not only EIDs and RLOCs that are used to facilitate container mobility as previously described, but also additional information that supports additional functionality for policy configuration and management of container traffic.

For example, assume that an information processing system in a given embodiment comprises at least one data center that includes one or more clouds hosting multiple tenants that share cloud resources. A given tenant could be an organization or a group of users within an organization. In many cases, a tenant would like to have its own dedicated portion of the virtualization infrastructure of the cloud for performance or security reasons. The LISP mapping system in such an arrangement allows a given tenant to be isolated and have its own dedicated containers, such that performance and security goals of the tenant can be more readily achieved. Accordingly, in the mapping database, EID-RLOC mapping entries can be additionally associated with particular tenant identifiers, such that one or more containers can be assigned to individual tenants.

Additionally or alternatively, different levels of Quality of Service (QoS) can be provided to tenants. For example, a tenant in the cloud can be classified based on the service offered to the tenant, such as services in a hierarchy of levels illustratively including "platinum," "gold" and "silver" levels. The LISP mapping system can be configured to enforce the weightings associated with the different service levels as identified in the additional information in the EID-RLOC entries.

Numerous other policies can be specified and enforced for different cloud tenants in this manner, including access control and other types of security policies. More generally, EID-RLOC entries can be supplemented with tenant profile information that allows implementation of policies relating to QoS, security or other factors.

It should be understood that the particular sets of modules and other components implemented in the systems 100 and 200 as described above are presented by way of example only. In other embodiments, only subsets of these components, or additional or alternative sets of components, may be used, and such components may exhibit alternative functionality and configurations.

Also, the particular processing operations and other system functionality described in conjunction with the diagrams of FIGS. 1 and 2 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 and 2 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory, and the processing device may be implemented at least in part utilizing one or more virtual machines.

As mentioned previously, portions of an information processing system as disclosed herein illustratively comprise cloud infrastructure. The cloud infrastructure comprises virtual machines implemented using a hypervisor. The hypervisor runs on physical infrastructure. The cloud infrastructure further comprises sets of applications running on respective ones of the virtual machines under the control of the hypervisor.

An example of a commercially available hypervisor platform that may be used to implement portions of an information processing system in one or more embodiments of the invention is the VMware® vSphere® which may have an associated virtual infrastructure management system such as the VMware® vCenter™.

One or more of the processing modules or other components of an information processing system as disclosed herein may therefore each run on a computer, server, storage device or other processing platform element. A given such element may be viewed as an example of what is more generally referred to herein as a "processing device."

The cloud infrastructure described above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

A given processing platform may comprise storage products such as VNX® and Symmetrix VMAX®, both commercially available from EMC Corporation of Hopkinton, Mass. Other types of storage products can be used in implementing a given processing platform, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation.

The particular processing platforms described above are presented by way of example only, and a given information processing system such as system 100 or 200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, software agents, containers and virtualization infrastructure that can benefit from the enhanced flexibility provided in container mobility and other types of network virtualization. Also, the particular configurations of system and device elements shown in FIGS. 1 and 2 and their associated processing operations can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing device comprising a processor coupled to a memory;
said at least one processing device implementing virtualization infrastructure including a first container comprising a software agent of a locator-identifier separation protocol;
the software agent being configured:
to communicate with a locator-identifier mapping system that associates identifiers of respective endpoints with respective locators in accordance with the locator-identifier separation protocol, wherein the endpoints comprise respective ones of a plurality of additional containers of the virtualization infrastructure;
to generate an endpoint identifier and locator pair for each of at least a subset of the additional containers implemented on a same host machine, wherein a same locator is used in the endpoint identifier and locator pairs generated for each of the subset of the additional containers implemented on the same host machine; and
to provide the generated endpoint identifier and locator pairs to the locator-identifier mapping system to register respective ones of the subset of the additional containers as endpoints in the locator-identifier mapping system;
wherein generating the endpoint identifier and locator pairs for the subset of the additional containers comprises associating tenant identifiers with each of the generated endpoint identifier and locator pairs;
wherein the first container comprises a dedicated container controlled by a cloud controller that is maintained persistently while the subset of the additional containers are spawned and taken down responsive to changing demands of one or more cloud tenants;
wherein the first container and the subset of the additional containers are associated with a common container repository such that the first container has knowledge of the subset of the additional containers implemented on the same host machine; and
wherein the first container utilizes the knowledge of the subset of the additional containers implemented on the same host machine and the tenant identifiers associated with the generated endpoint identifier and locator pairs to control routing to the subset of additional containers to enforce one or more policies for different ones of the one or more cloud tenants.

2. The apparatus of claim 1 wherein the first container and the plurality of additional containers are implemented on a single physical processing device and are associated with the common container repository.

3. The apparatus of claim 1 wherein the first container and the plurality of additional containers comprise respective Docker containers.

4. The apparatus of claim 1 wherein the plurality of additional containers have respective private IP addresses that are made externally addressable via the software agent.

5. The apparatus of claim 1 wherein the plurality of additional containers comprise respective cloud compute nodes.

6. The apparatus of claim 1 wherein first container is coupled to the plurality of additional containers via a bridge element that combines virtual interfaces of respective ones of the additional containers into a single physical network interface.

7. The apparatus of claim 6 wherein the bridge element comprises a pseudonetwork bridge.

8. The apparatus of claim 1 wherein the first container is coupled to a network via a router configured to operate in accordance with the locator-identifier separation protocol as an ingress tunnel router with respect to inbound packets directed to the additional containers via the first container and as an egress tunnel router with respect to outbound packets directed from the additional containers via the first container.

9. The apparatus of claim 1 wherein the locator comprises a network address of a bridge element coupled between the first container and the plurality of additional containers.

10. The apparatus of claim 1 wherein the first container is configured:
responsive to receipt of an outbound packet from a given one of the additional containers for delivery to an outside endpoint, to encapsulate the outbound packet to form a tunnel in accordance with the locator-identifier separation protocol and to forward the encapsulated packet; and
responsive to receipt of an inbound packet from an outside endpoint for delivery to a given one of the additional containers, to decapsulate the inbound packet from a tunnel in accordance with the locator-identifier separation protocol and to forward the decapsulated packet.

11. The apparatus of claim 1 wherein the locator-identifier separation protocol comprises Locator/ID Separation Protocol (LISP) and further wherein the identifiers comprise respective LISP Endpoint Identifiers (EIDs) and the locators comprise respective LISP Routing Locators (RLOCs).

12. The apparatus of claim 1 wherein the locator-identifier mapping system comprises one or more mapping servers each implementing at least a portion of a mapping database having a plurality of entries each comprising one of the endpoint identifiers in association with one of the locators.

13. An information processing system comprising the apparatus of claim 1.

14. A method comprising:
providing virtualization infrastructure including a first container comprising a software agent of a locator-identifier separation protocol; and
configuring the software agent:
to communicate with a locator-identifier mapping system that associates identifiers of respective endpoints with respective locators in accordance with the locator-identifier separation protocol, wherein the endpoints comprise respective ones of a plurality of additional containers of the virtualization infrastructure;
to generate an endpoint identifier and locator pair for each of at least a subset of the additional containers implemented on a same host machine, wherein a same locator is used in the endpoint identifier and locator pairs generated for each of the subset of the additional containers implemented on the same host machine; and
to provide the generated endpoint identifier and locator pairs to the locator-identifier mapping system to register respective ones of the subset of the additional containers as endpoints in the locator-identifier mapping system;
wherein the providing and configuring are performed by at least one processing device comprising a processor coupled to a memory;
wherein generating the endpoint identifier and locator pairs for the subset of the additional containers comprises associating tenant identifiers with each of the generated endpoint identifier and locator pairs;
wherein the first container comprises a dedicated container controlled by a cloud controller that is maintained persistently while the subset of the additional containers are spawned and taken down responsive to changing demands of one or more cloud tenants;
wherein the first container and the subset of the additional containers are associated with a common container repository such that the first container has knowledge of the subset of the additional containers implemented on the same host machine; and
wherein the first container utilizes the knowledge of the subset of the additional containers implemented on the same host machine and the tenant identifiers associated with the generated endpoint identifier and locator pairs to control routing to the subset of additional containers to enforce one or more policies for different ones of the one or more cloud tenants.

15. The method of claim 14 further comprising:
responsive to receipt of an outbound packet in the first container from a given one of the additional containers for delivery to an outside endpoint, encapsulating the outbound packet to form a tunnel in accordance with the locator-identifier separation protocol and forwarding the encapsulated packet; and
responsive to receipt of an inbound packet in the first container from an outside endpoint for delivery to a given one of the additional containers, decapsulating the inbound packet from a tunnel in accordance with the locator-identifier separation protocol and forwarding the decapsulated packet.

16. A non-transitory processor-readable storage medium having stored therein program code of one or more software programs, wherein the program code when executed by at least one processing device causes the processing device:
to provide virtualization infrastructure including a first container comprising a software agent of a locator-identifier separation protocol; and
to configure the software agent:
to communicate with a locator-identifier mapping system that associates identifiers of respective endpoints with respective locators in accordance with the locator-identifier separation protocol, wherein the endpoints comprise respective ones of a plurality of additional containers of the virtualization infrastructure;
to generate an endpoint identifier and locator pair for each of at least a subset of the additional containers implemented on a same host machine, wherein a same locator is used in the endpoint identifier and locator pairs generated for each of the subset of the additional containers implemented on the same host machine; and to provide the generated endpoint identifier and locator pairs to the locator-identifier mapping system to register respective ones of the subset of the additional containers as endpoints in the locator-identifier mapping system;

wherein generating the endpoint identifier and locator pairs for the subset of the additional containers comprises associating tenant identifiers with each of the generated endpoint identifier and locator pairs;

wherein the first container comprises a dedicated container controlled by a cloud controller that is maintained persistently while the subset of the additional containers are spawned and taken down responsive to changing demands of one or more cloud tenants;

wherein the first container and the subset of the additional containers are associated with a common container repository such that the first container has knowledge of the subset of the additional containers implemented on the same host machine; and wherein the first container utilizes the knowledge of the subset of the additional containers implemented on the same host machine and the tenant identifiers associated with the generated endpoint identifier and locator pairs to control routing to the subset of additional containers to enforce one or more policies for different ones of the one or more cloud tenants.

17. The apparatus of claim 1 wherein the software agent is further configured to utilize the tenant identifier of a given endpoint identifier and locator pair to enforce isolation of the given additional container in the virtualization infrastructure.

18. The apparatus of claim 1 wherein the software agent is further configured to utilize the tenant identifier of a given endpoint identifier and locator pair to enforce quality of service level weighting of operations in the locator-identifier separation protocol.

19. The apparatus of claim 1 wherein, responsive to the host machine moving from a first geographic location to a second geographic location, the software agent is configured to update the locators of the generated endpoint identifier and locator pairs for the subset of the additional containers.

20. The apparatus of claim 19 wherein the locators of the generated endpoint identifier and locator pairs are utilized to provide location-based services for applications running in the subset of the additional containers.

* * * * *